Patented Sept. 4, 1951

2,567,008

UNITED STATES PATENT OFFICE 2,567,008

ARYL ESTERS OF 4-CHLOROBENZENE SULFONIC ACID

Edgar C. Britton and Harold R. Slagh, Midland, Mich., assignors to The Dow Chemical Company, Midland, Mich., a corporation of Delaware No Drawing. Application October 31, 1949, Serial No. 124,732

3 Claims. (Cl. 260—456)

This invention is concerned with the aryl esters of 4-chlorobenzene sulfonic acid of the formula

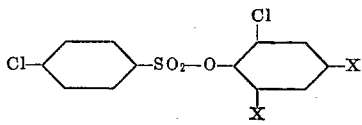

wherein one X represents a phenyl radical and the other X represents hydrogen. These new ester compounds are white crystalline solids somewhat soluble in many organic solvents and substantially insoluble in water. They are of value as toxic constituents of parasiticide compositions.

The new compounds may be prepared by reacting 4-chlorobenzene sulfonyl chloride with an alkali metal salt of 2-chloro-6-phenylphenol or 2-chloro-4-phenylphenol in water as reaction solvent. Substantially equimolecular proportions of the reactants have been found to give the desired ester product in good yields. In practice, the phenolate employed is preferably the sodium salt and may be prepared by reacting substantially equimolecular proportions of sodium hydroxide and 2-chloro-4-phenylphenol or 2-chloro-6-phenylphenol in water. The reaction between the aqueous phenolate and 4-chlorobenzene sulfonyl chloride may be accomplished by adding either reactant portionwise to the other.

In another mode of operation, the reaction may be accomplished by adding portionwise an aqueous solution of the sodium hydroxide to a mixture of 4-chlorobenzene sulfonyl chloride and 2-chloro-4 or 2-chloro-6-phenylphenol.

The above operations are carried out with stirring and at a temperature of from 20° to 100° C. The reaction is somewhat exothermic, and temperature control is maintained by the rate of addition of the reactants, as well as by the addition and subtraction of heat, if required.

Upon completion of the reaction, the crude mixture is cooled and subsequently filtered to obtain the desired ester product. The latter may be further purified as by repeated washing with water and recrystallization from organic solvents.

EXAMPLE 1

*3-chloro-2-biphenylyl ester of 4-chlorobenzene sulfonic acid*

10 grams (0.25) mole of sodium hydroxide dissolved in 180 milliliters of water was added portionwise over a period of 30 minutes and with stirring to a mixture of 51.1 grams (0.25 mole) of 2-chloro-6-phenylphenol and 52.75 grams (0.25 mole) of 4-chlorobenzene sulfonyl chloride. The addition was carried out at a temperature of from 60° to 70° C., and the resulting mixture maintained at this same temperature for one hour to complete the reaction. The crude mixture was then cooled to room temperature and filtered to obtain the 3-chloro-2-biphenylyl ester of 4-chlorobenzene sulfonic acid as a white crystalline residue. The latter was washed with water and recrystallized from ethanol to obtain the substantially pure ester melting at 119°–120° C.

EXAMPLE 2

*3-chloro-4-biphenylyl ester of 4-chlorobenzene sulfonic acid*

10 grams (0.25 mole) of sodium hydroxide dissolved in 180 milliliters of water was added portionwise over a period of 45 minutes and with stirring to a mixture of 51.1 grams (0.25 mole) of 2-chloro-4-phenylphenol and 52.75 grams (0.25 mole) of 4-chlorobenzene sulfonyl chloride. The addition was carried out at a temperature of from 60° to 70° C., and the resulting mixture maintained at about 70° C. for one hour to complete the reaction. Upon cooling the reaction mixture to room temperature, the crude 3-chloro-4-biphenylyl ester of 4-chlorobenzene sulfonic acid solidified in the form of white crystals. The latter was separated and recrystallized from ethanol to obtain 3-chloro-4-biphenylyl 4-chlorobenzene sulfonate melting at 73° to 76° C.

The compounds of this invention have been found effective as insecticides and may be employed in dosages required for insect control with negligible injury to the foliage of plants. In this use the compounds are preferably employed in combination with an inert carrier such as water or other liquid diluent. The compound may also be dispersed on a finely divided solid and employed as a dust mixture. Such dust mixture, if desired, may be suspended in water with the aid of a wetting agent and the suspension applied to plants in the form of a spray.

A representative composition found valuable for the control of agricultural pests is the following:

| Composition: | Parts by weight |
|---|---|
| 3 - chloro - 2 - biphenylyl ester of 4-chlorobenzene sulfonic acid | 3 |
| Sodium lauryl sulphate | 0.25 |
| Water | 829.7 |

The foregoing materials were mixed and ball-milled together to produce a spray composition containing 3 pounds of toxicant per 100 gallons of solution. When this composition was applied against Mexican bean beetle on cranberry bean plants, a 100 per cent kill of the organism was obtained.

We claim:

1. The 3-chloro-2-biphenylyl ester of 4-chlorobenzene sulfonic acid.

2. The 3-chloro-4-biphenylyl ester of 4-chlorobenzene sulfonic acid.

3. An aryl ester of 4-chlorobenzene sulfonic acid selected from the group consisting of the 3-chloro-2-biphenylyl ester of 4-chlorobenzene sulfonic acid and the 3-chloro-4-biphenylyl ester of 4-chlorobenzene sulfonic acid.

EDGAR C. BRITTON.
HAROLD R. SLAGH.

REFERENCES CITED

The following references are of record in the file of this patent:

UNITED STATES PATENTS

| Number | Name | Date |
|---|---|---|
| 2,148,928 | De Meuron | Feb. 28, 1939 |